United States Patent [19]
Blumrich

[11] 3,789,947
[45] Feb. 5, 1974

[54] OMNIDIRECTIONAL WHEEL
[75] Inventor: Josef F. Blumrich, Huntsville, Ala.
[73] Assignee: The United States of America as represented by the Administrator of the National Aeronautics and Space Administration, Washington, D.C.
[22] Filed: Apr. 17, 1972
[21] Appl. No.: 244,519

[52] U.S. Cl.............................. 180/79.3, 301/5 P
[51] Int. Cl............................................. B62d 5/02
[58] Field of Search............ 180/79.3, 6.2, 7 R, 8 F; 301/5 P

[56] References Cited
UNITED STATES PATENTS
3,465,843  9/1969  Guinot.............................. 180/79.3
FOREIGN PATENTS OR APPLICATIONS
822,660  11/1951  Germany............................. 301/5 P

*Primary Examiner*—Kenneth H. Betts
*Assistant Examiner*—John A. Pekar
*Attorney, Agent, or Firm*—L. D. Wofford, Jr. et al.

[57] ABSTRACT

The apparatus of the invention consists of a wheel having a hub with radially disposed spokes which are provided with a plurality of circumferential rim segments. These rim segments carry, between the spokes, rim elements which are rigid relative to their outer support surfaces, and defined in their outer contour to form a part of the circle forming the wheel diameter. The rim segments have provided for each of the rim elements an independent drive means selectively operable when the element is in ground contact to rotatably drive the rim element in a direction of movement perpendicularly lateral to the normal plane of rotation and movement of the wheel. This affords the wheel omnidirectional movement.

5 Claims, 4 Drawing Figures

OMNIDIRECTIONAL WHEEL

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

This invention relates in general to wheels such as may be used for propelling and giving direction to driven vehicles. The purpose of the invention is the achievement of maximum directional driving capability of a vehicle operating on the ground. The great majority of vehicles introduce a change of their driving direction by steering one or more of their wheels, this being accomplished by turning such wheels about a vertical or near-vertical axis. Vehicles of the endless track type can be steered by different speeds in the track. The normal wheel enables a vehicle to follow a curved path, and the application of tracks offers an additional advantage in the capability to turn the vehicle at the spot. Various types of wheels have been proposed for the steering of a vehicle which provide a short turning radius for the vehicle. However, none of the previously proposed devices of this type adequately provide a wheel which is sufficiently rigid to support a positive drive means capable of negotiating rough terrain; and at the same time, have the capability of direct mobility in any direction on the ground without requiring and change of orientation relative to the vehicle of which the wheel is a part. It can readily be seen that it is desirable to have a wheel for certain applications under normal conditions, such as used in the movement of mobile cranes, which would give this direct lateral movement. In space exploration, there is need for a wheel, such as that provided in a lunar vehicle, which can be readily subjected to the severe environmental conditions encountered in space exploration, provide maximum lateral movement capability, but also be dependable in its operation such that a failure of one driving means will not disable the entire wheel, and hence the space vehicle.

2. Discussion of Prior Art

The most pertinent reference in the prior art of this field is U.S. Pat. No. 3,465,843, to Guinot, for a Vehicle with Improved Steering Device.

This patent discloses a steering device mounted on the vehicle chassis for rotation in a substantially vertical plane transverse to the vehicle, the steering device having a plurality of carrier elements all having at least a portion of circular section and being pivotally mounted on respective axes transverse to the axis of rotation of the steering device.

This patent deals with a vehicle which is steered by a separate steering unit. Since all of the embodiments of the invention disclosed herein are designed to be mounted on the forward steering unit comprising the frame 6, as applied and suggested in this patent, they still afford a curved radius of turn for the vehicle to which they are mounted. Even those embodiments shown in FIG. 4, 5, 6 and 7 are, nevertheless, designed to afford a turn to the vehicle by swinging motion of the front end thereof in a radius defining a curved direction. It will be noted that in connection with the form of the reference patent as shown in FIGS. 5 and 6 that the axis of rotation 12 of the main body of the wheels 17 is parallel to the general longitudinal axis of the vehicle. The same is true of the axis 5 in FIG. 4. FIG. 7 in this patent, again, is a device to allow continued forward motion of the vehicle, the axes 5 to be substituted for the axes by the same designated number in FIG. 8, but employing an endless track with roller segments 19, again designed to swing the front of the vehicle in a curving radius of turn.

Nowhere in this patent is the concept shown where all of the wheels of the vehicle would have rim elements independently driven by rim segments, selectively operable when the element is in ground contact to rotatably drive the rim element in a direction of movement perpendicularly lateral to the normal plane of rotation and movement of the wheel, affording an omnidirectional movement, which could instantly move a vehicle in a direction lateral to the direction, or transverse to the direction of the normal forward movement. It should be noted, in this connection, that FIG. 5 and 6 of the reference patent do not disclose or suggest a driving means for the flexible toric tire 17. In the application of this embodiment there is no suggestion of independent driving means for this element.

Therefore, there is a need for a wheel such as the one which is disclosed in the instant specification.

SUMMARY AND OBJECTS OF INVENTION

Accordingly, it is a primary object of this invention to provide a driven wheel which will have the capability of providing omnidirectional movement.

A feature in connection therewith is the adaptation in a wheel of a rim having a plurality of spaced rim elements which will move laterally in relation to the normal plane of rotation and movement of the wheel.

A further important object is to provide a wheel of substantially rigid rim structure comprising a plurality of spaced rim elements which can be activated selectively to urge the wheel in a direction lateral to its normal plane of rotation.

A feature in this connection is to provide in such a wheel a hub with spokes carrying independently driven rim segments operable to selectively rotate, in a lateral direction, supported rim elements as they are in ground contact.

To achieve the foregoing objects and ends, I have provided a wheel having a hub with radially disposed spokes. At the outer end of each spoke there is located a shaft with its longitudinal axis perpendicular to the longitudinal axis of the spoke, and extending laterally therefrom. Upon each of the laterally extending shaft ends is carried a rotatable rim segment which supports on its outer surface rotatable rim elements having an arcuate surface forming the successive circumferential contact surfaces of the wheel. Each alternate pair of rim segments is independently propelled by a separate driving means. The other alternate pairs of rim segments around the circumference of the wheel, in the embodiment shown, are idler units without driving means.

There are two embodiments of the invention shown for independent driving means for the rim segments.

DETAILED DESCRIPTION OF THE INVENTION

Figure 1:
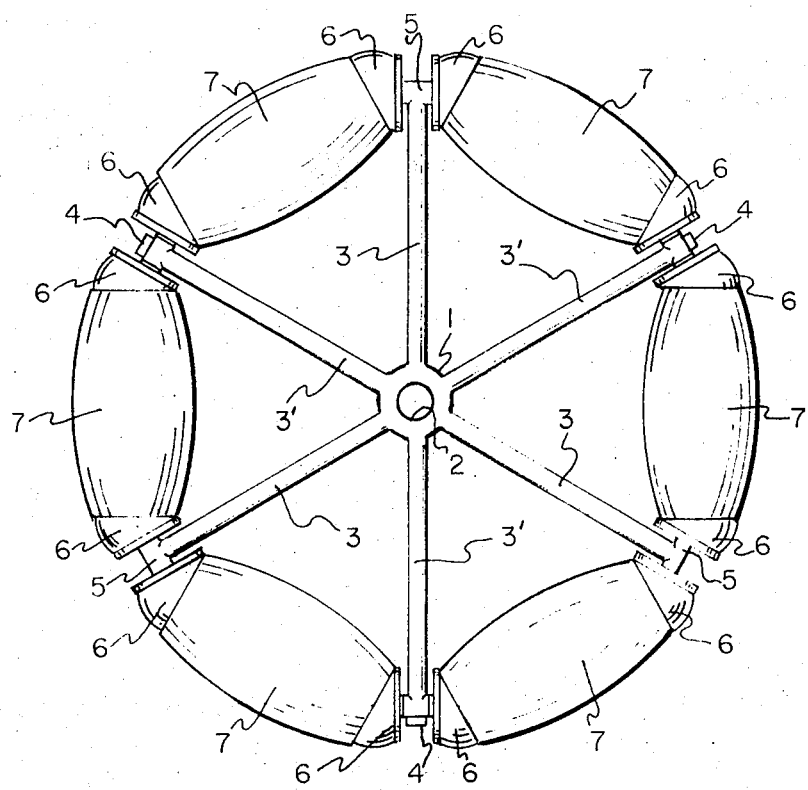
FIG. 1 is a pictorial elevation view of an embodiment of the wheel of the invention, showing the disposition of the rim segments supporting the circumferential rim elements.

Referring more particularly to the drawings, in FIG. 1 is shown one embodiment of the wheel of the invention as it would appear in a side view, provided with a hub 1 having a bore 2 adapted to receive the wheel shaft of a supported vehicle.

Figure 2:
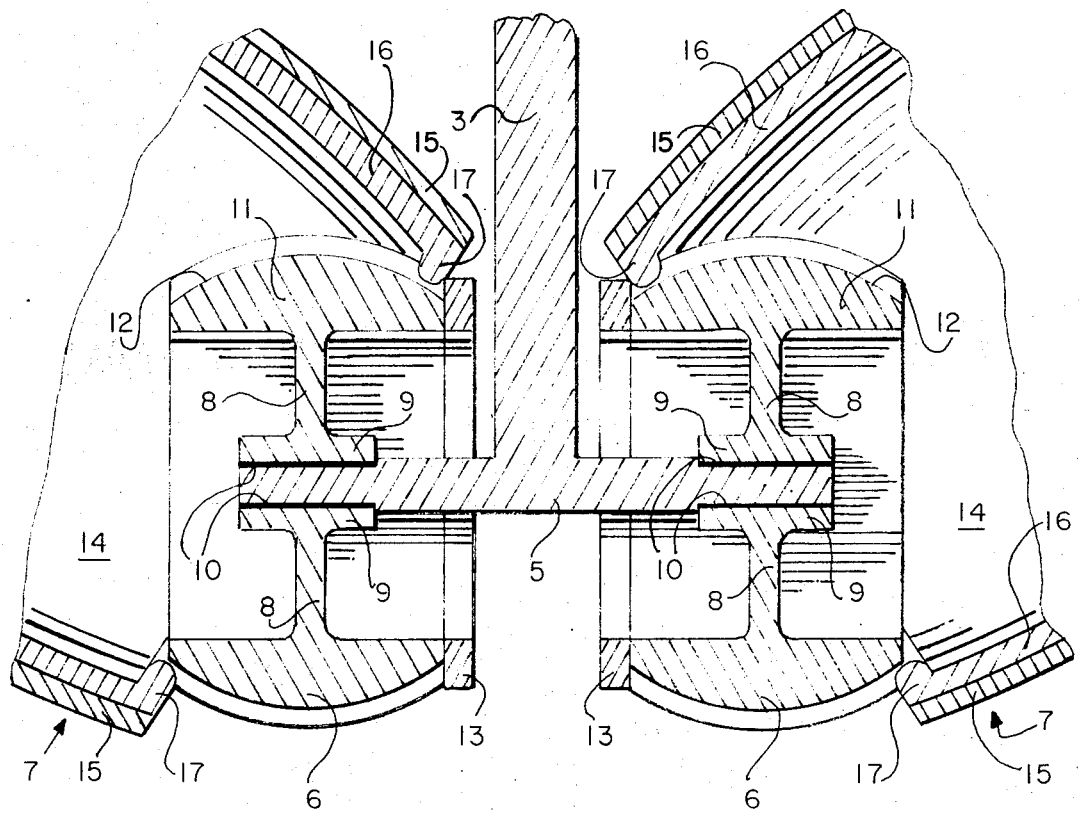
FIG. 2 is a partial sectional view taken through a non-driven, idler, pair of rim segments, along the respective longitudinal axes of a spoke, rim segments and the supported rim elements.
Figure 3:
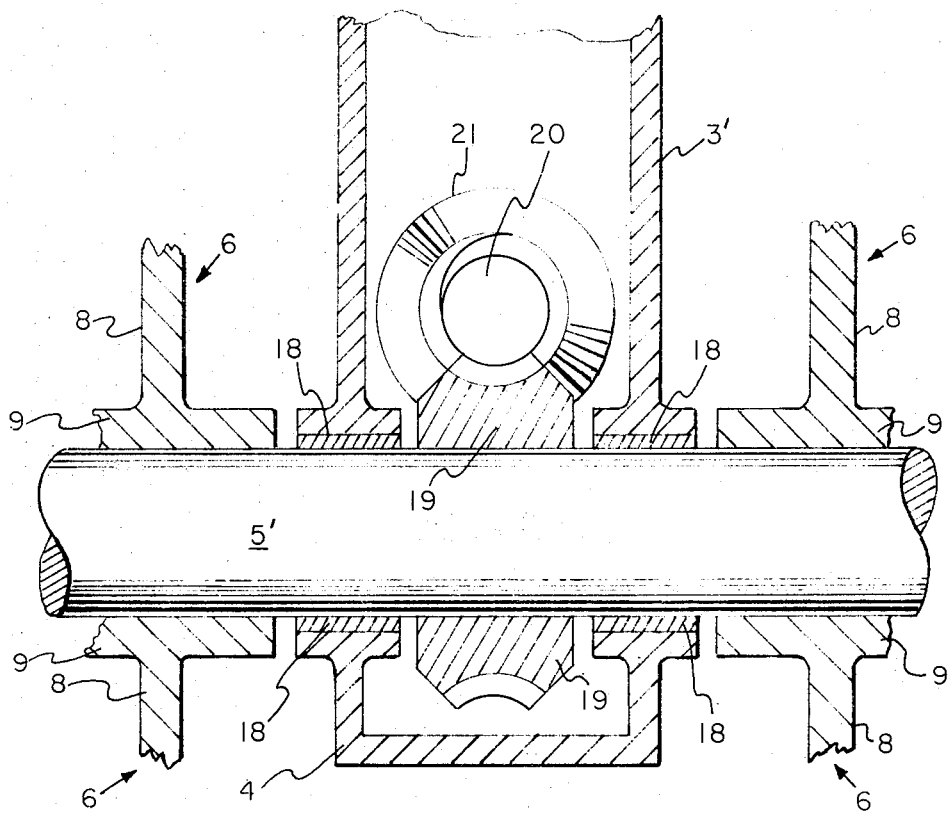
FIG. 3 is a partial sectional view taken through a pair of driven rim segments, along the respective longitudinal axes of the segments and spoke, with a full drive shaft in position, showing one embodiment of a drive means for the segments.
Figure 4:
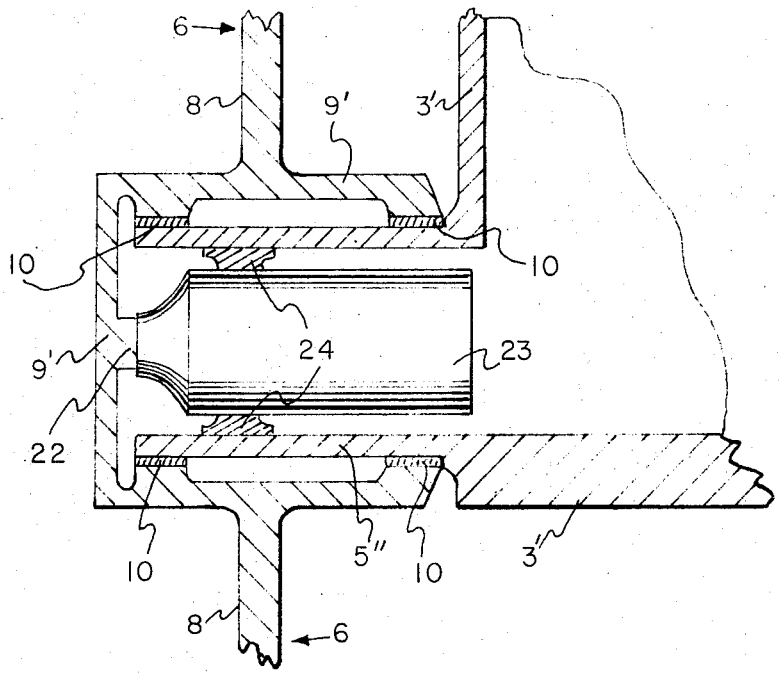
FIG. 4 is a partial sectional view taken through a pair of driven rim segments, along the respective longitudinal axes of the segments and spoke, showing another embodiment of a drive means for the segments.

Radially disposed around the hub 2 are a series of spokes 3 (3') which may be hollow with an extension 4, as shown in FIGS. 3 and 4, to accommodate the necessary electrical connections and a driving means; or they may be formed as a solid piece, as indicated in FIG. 2, where they carry idler rim segments.

At the outer end of each spoke there is provided a shaft 5 whose longitudinal axis is perpendicular to the longitudinal axis of the spoke. Rotatably mounted on each shaft is a pair of opposed rim segments 6. Each rim segment supports a rim element 7, the outer configuration of which is such that all of these elements together form the circumferential weight bearing surfaces of the wheel.

It can readily be seen that the concept of the invention is that the rim segments 6 will be employed to either support the rim elements 7 as idler units, or the segments 6 will drive these elements 7 to provide lateral motion, in the direction desired, in a plane of rotation perpendicular to the normal plane of rotation of the wheel. Hence, while each spoke 3 could support a set of rim segments 6 and elements 7 provided with a driving means, the wheel can be constructed with alternate spokes provided with a driving means as in the embodiment shown.

Referring more particularly to FIG. 2, where the partial sectional view is taken through an idler set of rim segments and elements, each rotating rim segment 6 comprises a wheel having its own spoke 8 and hub 9 suitably mounted on a bearing surface 10 on the shaft 5. The outer rim 11 is semi-spherical, formed with at least two lengthwise extending opposed grooves 12, and has affixed to its inner edge a retaining collar 13.

The rim element 7 is of arcuate configuration, contoured with an arc radius corresponding to that of the wheel, as indicated in FIG. 1, such that the elements will form with their outer weight bearing surfaces the continuous circumference of the wheel. Each rim element is provided with a cavity 14 adapted to receive the projection of the rim segment 6, as shown; and has an outer casing 15 which may be of metal, rubber or suiitable synthetic material, depending upon the environment in which the wheel will be employed.

The cavity 14 of the rim element 7 has at least two, correspondingly opposed, rigid splines 16 having formed at their ends inwardly projecting teeth 17 adpted to be received by the corresponding grooves 12 of the rim segments 6.

In the embodiment of the invention shown in FIG. 2, the teeth 17 must be circular in cross-section and their configuration corresponding to the inner contour of the grooves 12. It is also desirable that each of the longitudinal axes of the teeth 17 be collinear with a radius of the semi-spherical rim segment 6, along the circumference of which the grooves 12 are formed; and that the segments 6 extend inwardly, relative to the rim elements 7, a sufficient distance to afford a firm base on which the teeth may rest to support these elements. This is true because the teeth are both load-bearing and pivotal in their function, as follows: When the rim segments 6 rotate about the shaft 5 the teeth 17 traverse the length of the grooves 12, with the segments 6 imparting rotation along their longitudinal axes to the rim elements 7. Geometrically, this relationship results in a force transversely across the grooves, as they move out of their top or bottom dead-center position, and the teeth traverse the length of the grooves. This can be visualized if one considers the relationship as that of a universal joint in a driving operation. The retaining collar 13, it can be seen, operates as a stop for the teeth 17 and also maintains the spaced relationship of the rim elements 7 from the spokes 3.

In the embodiment of the invention indicated, the number of radial toothed splines 16 and corresponding grooves 12 employed will depend upon the load-bearing stability demanded of the wheel; as long as they are arranged in opposing pairs, with the longitudinal axes of the teeth oriented as indicated relative to the radius of the rim segments, and such that there will be no "wiping effect" to destroy the lands between the grooves. The lands of the rim segments are the main weight transfer bearing surfaces for the rim elements.

Referring to FIG. 3, there is illustrated one embodiment of a driving means to impart rotational motion to the rim segments 6. In this illustration, the alternate spokes 3' are provided as indicated with an extension 4, the spokes being hollow to house the driving mechanism. The shaft 5' (not in section for better definition) is mounted through the spoke 3' on bearing surfaces 18, with its longitudinal axis perpendicular to the longitudinal axis of the spoke. Rim segments 6, having their own spokes 8, are rigidly affixed by their hubs 9 to the shaft 5'. Within the hollow of the spokes 3' a worm gear wheel 19 is also rigidly affixed to the shaft 5', and corresponds with a worm 20 which is driven by an electric gear motor 21.

Referring then to FIG. 4, another embodiment of a driving means for the rim segments can be seen. Here, the spoke 3' is formed with a laterally extending hollow shaft 5'', whose axis is perpendicular to the longitudinal axis of the spoke 3'. In this illustration there is a modification of the rim segment hub 9 such that it can be mounted on bearing surfaces 10 on the shaft 5''The hub 9' is also provided at its outer end with an inwardly extending drive shaft 22. The shaft 22 is driven by means of an electric motor 23 which is rigidly mounted in centered position within the hollow shaft 5'' by means of a mounting collar or bracket 24 affixed to the shaft.

It can now be seen that there are other possible variations of the driving means, as indicated in FIGS. 3 and 4, in their application to the wheel as shown in FIG. 1. Driving means could be provided in the case of each spoke 3 for each pair of rim segments to provide more power, but under normal circumstances the use of a driving means at each alternate spoke would appear to be satisfactory. Of course, the electrical connections to actuate the motors for the driving means can be through the center of the hollow spokes; and it will be apparent that the motors could be continuously operable or a switch system could be used to actuate the driving means for each rim segment only when the rim element is in contact with the ground. It is contemplated that on a four-wheeled vehicle the switching means would be synchronized such that all of the ground contacting elements would be actuated at the same time to start, stop, or reverse the operating motors to move the wheel laterally, with regard to its normal plane of rotation, in any direction desired.

The motors shown could be replaced by hydraulic or pneumatic drives. Another possibility is the arrangement of a central motor and gear unit outside the rim near the main hub of the wheel, with mechanical power transmissions through the spokes to the individual rim segments and elements.

Other possibilities exist for the construction of the rim elements. The barrel-shaped configuration shown in FIGS. 1 and 2 could be replaced by a curved cylindrical segment or element of flexible material. For that purpose, known solutions like the Goodyear drop thread concept or the principle used for flexible metal hoses can be applied. However, for the purpose of a stable wheel with a positive lateral drive it is necessary that the rim element have enough rigidity to transmit a positive drive to the rim element without slippage. Accordingly, the toric element as indicated in U.S. Pat. No. 3,465,843, to Guinot, would not be appropriate for this purpose, as previously discussed.

The wheel of the present invention has obvious advantages. It will provide omnidirectional movement for a vehicle through a direct lateral movement of each wheel in relation to the normal plane of rotation and movement of the wheel. This means that a vehicle could be moved abruptly in a lateral direction, rather than in an emergency required to assume an arcing turn about a prescribed radius. At the same time, by applying lateral movement as well as forward movement of the wheel, an arcuate radius of turn can be achieved.

An important advantage in the application of this type of vehicle wheel in space exploration resides in its conservation of power. Where the power source is an energy cell of limited life the power expended in rotating the entire rim of a wheel in lateral motion, or an entire toric element, would be wasteful. By providing a wheel with a rim having a plurality of space rim elements which will move laterally in relation to the normal plane of rotation and movement of the wheel, of the type shown in this invention, it is possible to selectively rotate only that rim element in contact with the ground, and thereby use a much smaller driving means, requiring less energy in operation. This is particularly true where the forward motion of the wheel in its normal plane of rotation would be halted, and, then, lateral motion imparted to the element of the wheel rim in contact with the ground. It is also possible to afford by this means a system where, if one of the driving means experienced a failure in operation, the wheel could simply be moved in its normal plane to another one of the selectively operated wheel elements.

From the foregoing it will be seen that the invention is well adapted to attain all of the ends and objects hereinabove set forth, together with other advantages which are obvious and which are inherent to the structure.

It will be understood that certain features of any subcombinations of the invention are of utility and may be employed without reference to other features and subcombinations. This is contemplated by and is within the scope of the claims.

As many possible embodiments of the invention may be made without departing from the scope thereof, it is to be understood that all matter set forth or shown in the drawings is to be interpreted as illustrative and not in a limiting sense.

Having thus described the invention, what is claimed is:

1. An omnidirectional wheel for transporting a vehicle over a travel surface of the character described comprising:

a hub;

a radially disposed support structure for rim elements extending from said hub;

a plurality of peripherally spaced laterally rotatable rim segments having shafts mounting the same on said support structure;

a plurality of peripherally spaced laterally rotatable rim elements with means supportably mounting the same on said segments;

said rim elements being mounted with their axes of lateral rotation lying in the normal plane of rotation of said wheel, and their lateral plane of rotation laterally perpendicular to the plane of rotation of said wheel;

means for separately driving said rim elements and segments, selectively operable to actuate the same in lateral rotation when said elements are in contact with the travel surface;

each of said rim elements comprising an axially extended casing member having an outer contact surface arcuately contoured to conform to the circumference of said wheel and an inner cavity receiving said rim segments.

2. Apparatus as in claim 1, wherein;

said rim segments comprise shaft mounted wheel elements having semispherical support surfaces supporting said rim elements;

said elements and segments having corresponding interlocking connecting means thereon rotatably engaging the same.

3. Apparatus as in claim 2, wherein said connecting means comprises a lengthwise extended groove on said rim segment and a corresponding spline on said rim element having a depending tooth of substantially circular cross-section received by said groove, movable longitudinally and rotatable therein, such as to impart driving motion in angular relation from said segment to said element.

4. Apparatus of the character described in claim 1, wherein said means for separately driving said rim segments comprises, in combination with said shaft fixedly supporting said segments, motor drive means mounted in said support structure adjacent to said shaft, including a rotating worm and a worm gear affixed to said shaft, such as to drive said shaft selectively in reciprocal motion.

5. Apparatus of the charactr described in claim 1, wherein said means for separately driving said rim segments comprises, in combination with a hollow shaft movably supporting said segments, motor drive means, axially mounted in said hollow shaft, having a separate drive coupling engaging an extension of said rim segment, such as to drive said segment selectively in reciprocal motion.

* * * * *